United States Patent
Marcum

(10) Patent No.: US 11,756,040 B2
(45) Date of Patent: Sep. 12, 2023

(54) SYSTEM AND METHOD FOR GENERATING A CONTENTION SCHEME

(71) Applicant: Kevin Wayne Marcum, South Hero, VT (US)

(72) Inventor: Kevin Wayne Marcum, South Hero, VT (US)

(73) Assignee: Kevin Wayne Marcum, South Hero, VT (US)

( * ) Notice: Subject to any disclaimer, the term of this patent is extended or adjusted under 35 U.S.C. 154(b) by 0 days.

(21) Appl. No.: 17/397,360

(22) Filed: Aug. 9, 2021

(65) Prior Publication Data

US 2023/0042823 A1    Feb. 9, 2023

(51) Int. Cl.
| | |
|---|---|
| G06Q 20/40 | (2012.01) |
| G06Q 20/38 | (2012.01) |
| G06N 20/00 | (2019.01) |
| G06Q 20/42 | (2012.01) |
| G06F 18/2113 | (2023.01) |

(52) U.S. Cl.
CPC ....... *G06Q 20/403* (2013.01); *G06F 18/2113* (2023.01); *G06N 20/00* (2019.01); *G06Q 20/3821* (2013.01); *G06Q 20/3825* (2013.01); *G06Q 20/42* (2013.01)

(58) Field of Classification Search
CPC ............ G06Q 20/403; G06Q 20/3821; G06Q 20/3825; G06Q 20/42; G06K 9/623; G06N 20/00
See application file for complete search history.

(56) References Cited

U.S. PATENT DOCUMENTS

| | | | |
|---|---|---|---|
| 7,412,417 B1* | 8/2008 | Tuttle | G06Q 40/12 705/30 |
| 7,593,891 B2 | 9/2009 | Kornegay et al. | |
| 7,711,635 B2 | 5/2010 | Steele | |

(Continued)

FOREIGN PATENT DOCUMENTS

| | | | |
|---|---|---|---|
| CN | 111277415 A | * | 6/2020 |
| CN | 112769782 A | * | 5/2021 |
| WO | WO-2021199240 A1 | * | 10/2021 |

OTHER PUBLICATIONS

Wenting Zheng, Helen: Maliciously Secure Coopetitive Learning for Linear Models, Sep. 2019, arXiv:1907.07212 [cs.CR] (Year: 2019).*

(Continued)

*Primary Examiner* — Neha Patel
*Assistant Examiner* — Chunling Ding
(74) *Attorney, Agent, or Firm* — CALDWELL INTELLECTUAL PROPERTY LAW

(57) ABSTRACT

A system for generating a contention scheme includes a computing device, the computing device configured to obtain a solvency signature as a function of a solvency entity, determine a solvency grouping as a function of the solvency signature, identify a null element as a function of the solvency grouping, wherein identifying the null element further comprises receiving a regulation element as a function of a regulation database, and identifying the null element as a function of the regulation element and the solvency grouping, produce a weighted vector as a function of the null element, and generate a contention scheme as a function of the weighted vector.

20 Claims, 8 Drawing Sheets

(56) References Cited

U.S. PATENT DOCUMENTS

| | | | |
|---|---|---|---|
| 7,818,228 B1* | 10/2010 | Coulter | G06Q 40/02 |
| | | | 705/35 |
| 8,285,613 B1 | 10/2012 | Coulter | |
| 8,762,243 B2 | 6/2014 | Jenkins et al. | |
| 8,868,927 B1* | 10/2014 | Lee | G06F 11/30 |
| | | | 713/189 |
| 2005/0154664 A1 | 7/2005 | Guy et al. | |
| 2006/0212386 A1* | 9/2006 | Willey | G06Q 40/02 |
| | | | 705/38 |
| 2007/0112668 A1 | 5/2007 | Celano et al. | |
| 2009/0048957 A1 | 2/2009 | Celano | |
| 2014/0258083 A1 | 9/2014 | Achanta et al. | |
| 2014/0279387 A1 | 9/2014 | Shifman et al. | |
| 2014/0379554 A1 | 12/2014 | Grossman et al. | |
| 2015/0112874 A1 | 4/2015 | Serio et al. | |
| 2016/0005111 A1* | 1/2016 | Deshpande | G06Q 40/00 |
| | | | 705/35 |
| 2017/0286962 A1* | 10/2017 | Lai | G06Q 20/4016 |
| 2018/0075527 A1 | 3/2018 | Nagla et al. | |
| 2018/0158158 A1* | 6/2018 | Coogan-Pushner | G06Q 50/26 |
| 2019/0043070 A1 | 2/2019 | Merrill et al. | |
| 2019/0043125 A1 | 2/2019 | Cropper | |
| 2020/0327534 A1* | 10/2020 | Swanson | G06Q 30/0641 |
| 2020/0334749 A1* | 10/2020 | Shang | H04L 9/0643 |
| 2021/0165901 A1* | 6/2021 | Chandrashekhar | |
| | | | G06F 21/6218 |
| 2022/0351284 A1* | 11/2022 | Cañón | G06Q 30/06 |

OTHER PUBLICATIONS

David Deninzon, Vijay D'Silva, Rohit Sood, Payment disputes in banking: A pathway to deeper customer relationships, Jun. 16, 2018.

* cited by examiner

US 11,756,040 B2

SYSTEM AND METHOD FOR GENERATING A CONTENTION SCHEME

FIELD OF THE INVENTION

The present invention generally relates to the field of artificial intelligence. In particular, the present invention is directed to a system and method for generating a contention scheme.

BACKGROUND

Current consumers suffer from complex avenues to resolve disputes relating to solvency. This is further complicated by the lack of transparency from solvency agencies and/or entities. Consumers are challenged with the process of fixing discrepancies without adequate information.

SUMMARY OF THE DISCLOSURE

In an aspect, a system for generating a contention scheme includes a computing device, the computing device configured to obtain a solvency signature as a function of a solvency entity, determine a solvency grouping as a function of the solvency signature, identify a null element as a function of the solvency grouping, wherein identifying the null element further comprises receiving a regulation element as a function of a regulation database, and identifying the null element as a function of the regulation element and the solvency grouping, produce a weighted vector as a function of the null element, and generate a contention scheme as a function of the weighted vector.

In another aspect, a method for generating a contention scheme includes obtaining, by a computing device, a solvency signature as a function of a solvency entity, determining, by the computing device, a solvency grouping as a function of the solvency signature, identifying, by the computing device, a null element as a function of the solvency grouping, wherein identifying the null element further comprises receiving a regulation element as a function of the regulation database, and identifying the null element as a function of the regulation element and the solvency grouping, producing, by the computing device, a weighted vector as a function of the null element, and generating, by the computing device, a contention scheme as a function of the weighted vector.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a contention scheme. In an embodiment, this disclosure can obtain a solvency signature. Aspects of the present disclosure can be used to determine a solvency grouping. Aspects of the present disclosure can also be used to identify a null element such as, but not limited to a discrepancy and/or violation of a regulation element. This is so, at least in part, because this disclosure can receive the regulation element as a function of a regulation database. Aspects of the present disclosure can also be used to produce a weighted vector, wherein the weighted vector may denote one or more success parameters for resolving the discrepancy and/or violation. Aspects of the present disclosure allow for the practical application of generating a contention scheme that may resolve one or more disputes. Exemplary embodiments illustrating aspects of the present disclosure are described below in the context of several specific examples.

Figure 1:
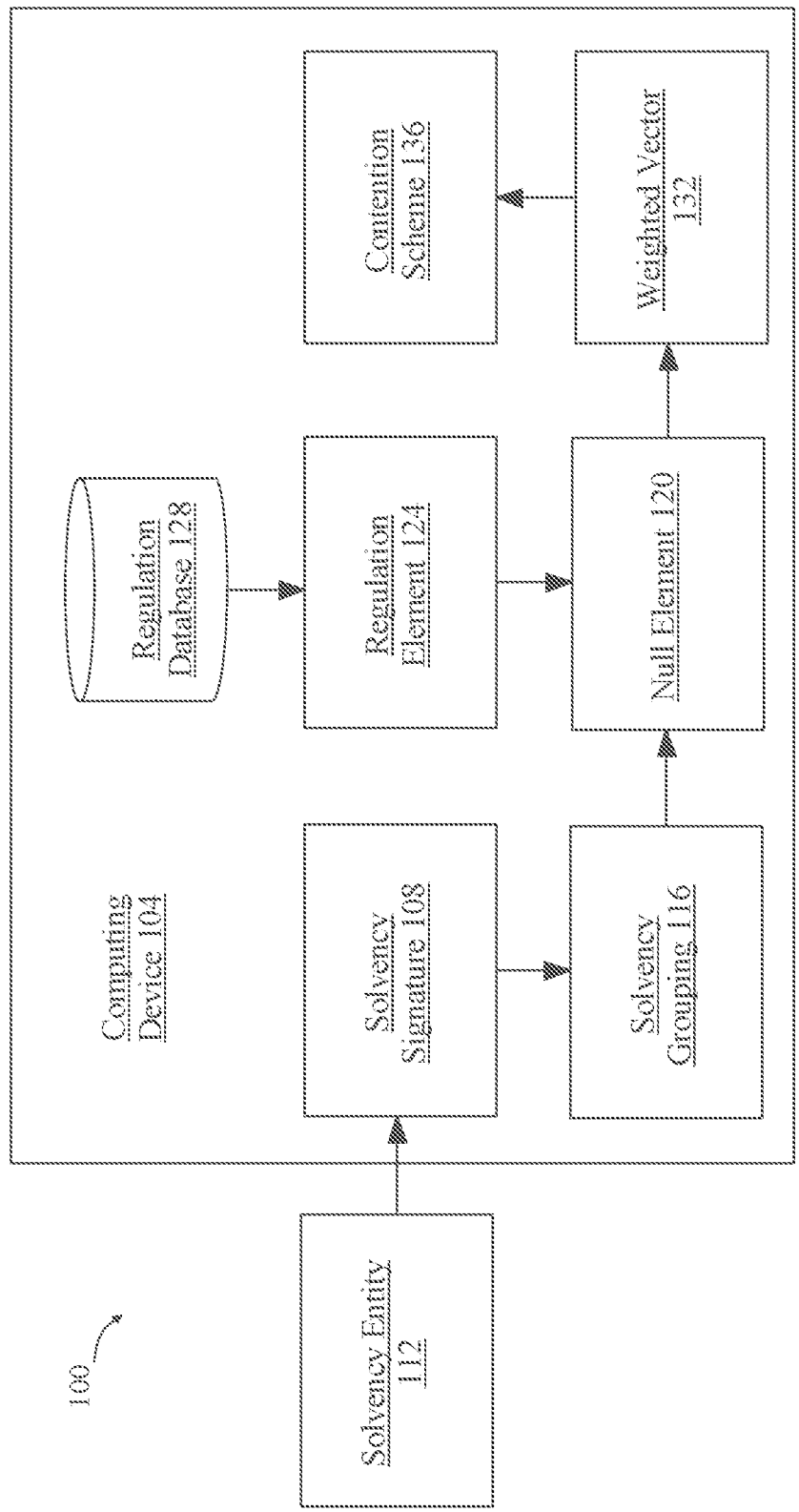
FIG. 1 is a block diagram illustrating an exemplary embodiment of a system for generating a contention scheme.

Referring now to FIG. 1, an exemplary embodiment of a system 100 for generating a contention scheme is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, obtains a solvency signature 108. As used in this disclosure a "solvency signature" is a distinctive signature relating to a particular user's solvency and/or credit, such that a profile and/or representation of the user may be established. As a non-limiting example, solvency signature 108 may include one or more credit reports, credit monitoring values, and the like thereof. As a further non-limiting example a user signature may include one or more passwords associated with a user solvency and/or a credit report of the user. In an embodiment, and without limitation, solvency signature 108 may include a user identifier. As used in this disclosure a "user identifier" is a unique identification of a user that relates to one or more elements of solvency and/or credit. As a non-limiting example, user identifier may include one or more uniquely identifying electronic signatures of the user, such as emails, bank records, and telecommunication addresses. As a further non-limiting example, user identifier may include one or more distinct locations, such as residential addresses, career addresses, and/or remote addresses. As a further non-limiting example, user identifier may include a user's password of an account. As a further non-limiting example, user identifier may include one or more personal information records such as, but not limited to a name, address, type of address, such as but not limited to single family, apartment complex, and/or post office box, social security number, and the like thereof. As a further non-limiting example, user identifier may include a birth year, phone number, spouse, co-applicant, current employer, former employer, personal statement, and the like thereof. As a further non-limiting example, user identifier may include a credit account, loan account, bank account, account status, date opened, credit limit, original amount, account type, and the like thereof. In an embodiment, and without limitation, user identifier may include one or more biometric signatures, wherein a biometric signature is a biologically identifying quality of an individual. Biometric signatures may include, without limitation, fingerprints, finger lengths, palm size, iris patterns, voice characteristics, retinal patterns, voice tones, facial orientation, skin tone, speech patterns, and the like thereof. As a non-limiting example, solvency signature 108 may include a user's iris patterns in conjunction with a bank record in conjunction with a residential address.

Still referring to FIG. 1, computing device 104 obtains solvency signature 108 as a function of a solvency entity 112. As used in this disclosure a "solvency entity" is a data collection entity that gathers, stores, and distributes a user solvency signature. In an embodiment, and without limitation, solvency entity 112 may gather information from a plurality of creditors and/or lenders and provide that information to a consumer reporting agency, credit reference agency, credit reporting body, credit information company, special accessing entity, private lenders, and the like thereof. In an embodiment, and without limitation, solvency entity 112 may gather information relating to a user solvency signature as a function of a credit rating agency, such as but not limited to Moody's Investors Services, Standard & Poor's, Fitch Ratings, and the like thereof. In an embodiment, and without limitation, solvency entity 112 may denote one or more entities that are governed by a government agency, such as but not limited to the Federal Trade Commission and/or the Office of the Comptroller of the Currency. In another embodiment, and without limitation, solvency entity 112 may denote one or more national traditional consumer reporting agencies. As a further non-limiting example, solvency entity 112 may denote one or more alternative credit bureaus.

Still referring to FIG. 1, obtaining solvency signature 108 may comprise encrypting solvency signature 108 as a function of a cryptographic function, wherein a cryptographic function is a mathematical algorithm that transforms plaintext data into ciphertext that is incomprehensible without first being decrypted, as described below in detail, in reference to FIG. 2. In an embodiment, and without limitation, cryptographic function may include one or more cryptographic hash functions, cryptographic primitives, secure multiparty computations, and the like thereof, as described in further detail below, in reference to FIG. 2.

Still referring to FIG. 1, computing device 104 determines a solvency grouping 116 as a function of solvency signature 108. As used in this disclosure a "solvency grouping" is a category and/or grouping of data that relates to a solvency signature. In an embodiment, and without limitation, solvency grouping 116 may include one or more categories obtained from a solvency database, wherein a solvency database is described below in detail, in reference to FIG. 5.

For example, and without limitation, solvency grouping may denote an accounts element, wherein an accounts element denotes a magnitude of credit accounts relating to solvency signature 108. As a further non-limiting example, solvency grouping 116 may denote an inquiry element, wherein an inquiry element denotes a magnitude of inquiries and/or searches of solvency signature 108. As a further non-limiting example, solvency grouping 116 may denote a payment element, wherein a payment element denotes one or more payment statuses, payment status dates, past-due amounts, monthly payments, late payments, and the like thereof. As a further non-limiting example, solvency grouping 108 may denote a payment history, such as but not limited to a closed status, chapter 13 bankruptcy status, collection status, default status, foreclosure status, claim status, paid status, repossession status, voluntary surrender status, and the like thereof. As a further non-limiting example, solvency status 108 may denote a collections element, a public records element, a credit inquiries element, a medical records, charge-off element, a creditor contact information, and the like thereof.

In an embodiment, and still referring to FIG. 1, computing device 104 may determine solvency grouping 116 as a function of a grouping recognition as a function of solvency signature 108. As used in this disclosure "grouping recognition" is a subtask of information extraction that seeks to locate and classify groupings mentioned in unstructured text into pre-defined categories. Pre-defined categories may include, without limitation, categories such as credit accounts, credit inquires, accounts in late payment, collections, charge-off, inquiries, public records, creditor contact info, and the like thereof. In an embodiment, one or more categories may be enumerated, to find total count of mentions in such documents. Computing device 104 may configure a neural network to perform grouping recognition by extracting, from one or more solvency signatures, one or more words and/or other semantic units. As a non-limiting example, computing device 104 may perform named grouping recognition to at least compare extracted significant terms to semantic units.

Still referring to FIG. 1, computing device 108 may perform grouping recognition by producing a language processing model. Language processing model may include a program automatically generated by computing device 104 and/or grouping recognition to produce associations between one or more significant terms extracted from solvency signature 108 and detect associations, including without limitation mathematical associations, between such significant terms. Associations between language elements, where language elements include for purposes herein extracted significant terms, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted significant term indicates a given category of semantic meaning. As a further example, statistical correlations and/or mathematical associations may include probabilistic formulas or relationships indicating a positive and/or negative association between at least an extracted significant term and/or a given semantic relationship; positive or negative indication may include an indication that a given solvency signature does not contain and/or indicate a grouping semantic relationship. Whether a phrase, sentence, word, or other textual element in solvency signature constitutes a positive or negative indicator may be determined, in an embodiment, by mathematical associations between detected significant terms, comparisons to phrases and/or words indicating positive and/or negative indicators that are stored in memory at computing device, or the like.

Still referring to FIG. 1, computing device 104 may generate the grouping recognition by any suitable method, including without limitation a natural language processing classification algorithm; language processing model may include a natural language process classification model, for instance as generated by training neural network, that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between semantic elements such as terms, phrases, tokens, etc. There may be a finite number of categories to which an extracted word may pertain; an HMM inference algorithm, such as the forward-backward algorithm or the Viterbi algorithm, may be used to estimate the most likely discrete state given a word or sequence of words. Computing device 104 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

In an embodiment, and still referring to FIG. 1, computing device 104 may train language processing module using multi-task learning. As used herein, multi-task learning (MTL) is a subfield of machine learning in which multiple learning tasks are solved at the same time, while exploiting commonalities and differences across tasks. This may result in improved learning efficiency and prediction accuracy for the task-specific models, when compared to training models separately.

Still referring to FIG. 1, computing device 104 identifies a null element 120 as a function of solvency grouping 116. As used in this disclosure a "null element" is an element of data denoting that a solvency grouping is in a violation and/or is divergent to a rule and/or regulation. For example and without limitation, null element may denote that solvency grouping 116 comprises a collections account, wherein the credit account is listed as open, wherein a federal rule may denote that a violation has occurred because a collections account may not be listed as an open account. Computing device 104 may identify null element 120 as a function of receiving a regulation element 124. As used in this disclosure a "regulation element" is an element of data denoting a rule and/or requirement that must be adhered to. For example, and without limitation, regulation element 124 may denote one or more federal laws, federal codes, federal rules, consumer credit laws, state laws, state codes, state rules, and the like thereof. As a non-limiting example, regulation element 124 may include one or more regulations outlined as a function of the Equal Credit Opportunity Act. As a further non-limiting example, regulation element 124 may include one or more regulations outlined as a function of the Fair Credit Reporting Act. As a further non-limiting example, regulation element 124 may include one or more regulations outlined as a function of the Fair Debt Collection Practices Act. As a further non-limiting example, regulation element 124 may include one or more regulations outlined as a function of the Truth in Lending Act. As a further non-limiting example, regulation element 124 may include one or more regulations outlined as a function of the Credit Repair Organizations Act. In an embodiment, and without limitation, receiving regulation element 124 may further comprise obtaining a regulation input. As used in this disclosure a "regulation input" is a user entered input representing one or more regulations and/or rules to be followed. For example, and without limitation, regulation input may be obtained as a function of a governmental official, law enforcement personnel, regulatory personnel, management, and the like thereof entering one or more regulations and/or rules that must be followed. For example, and without limitation, a quality control and/or quality assurance officer may denote that a solvency signature may not comprise a solvency grouping stating that a credit account is open, wherein the credit accounts status states it is in collections.

Still referring to FIG. 1, computing device 104 receives a regulation element 124 as a function of a regulation database 128. As used in this disclosure a "regulation database" is a database and/or datastore that comprises a plurality of regulations from a plurality of regulatory sources, wherein a regulatory source includes one or more government entities, private entities, regulatory entities, and the like thereof. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In an embodiment, and without limitation, regulation database 128 may comprise one or more rules and/or regulations outlined as a function of the United States Constitution, the Federal Code of Regulations, the Uniform Consumer Credit Code, the Federal Judicial Decisions, and the like thereof.

Still referring to FIG. 1, computing device 104 identifies null element 120 as a function of regulation element 124 and solvency grouping 116. In an embodiment, and without limitation, computing device 104 may identify null element 120 as a function of determining a proposition as a function of a logical premise, wherein a logical premise is described below in detail, in reference to FIG. 3. As used in this disclosure a "proposition" is a logical conclusion that is identified as a function of a logical reasoning and/or logical premise. For example, and without limitation, proposition may be one or more logical conclusions as a function of a valid syllogistic logical premise, such as but not limited to an unconditionally valid logical premise and/or a conditionally valid logical premise. As a further non-limiting example, proposition may be one or more logical conclusions as a function of a valid propositional form, such as but not limited to a Modus ponens logical argument, Modus tollens logical argument, hypothetical syllogism logical premise, disjunctive syllogism logical premise, constructive dilemma logical premise, and the like thereof. As a non-limiting example, proposition may denote that a logical conclusion of invalid may be determined as a function of a hypothetical syllogism logical premise comprising an "if-then" argument.

Still referring to FIG. 1, computing device 104 produces a weighted vector 132 as a function of null element 120. As used in this disclosure a "weighted vector" is a vector that represents one or more dispute strengths, wherein a "vector" as defined in this disclosure is a data structure that represents one or more a quantitative values and/or measures dispute strengths. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes. In an embodiment, and without limitation, weighted vector 132 may be weighted as a function of the relative dispute strengths. For example, and without limitation, weighted vector may be a value of 94, as a function of a vector comprising a value of 80, wherein a dispute strength has a high magnitude.

In an embodiment, and still referring to FIG. 1, computing device 104 may produce weighted vector 132 as a function of training a weighted machine-learning model. As used in this disclosure an "weighted machine-learning model" is a machine-learning model to identify a weighted vector 132 output given null elements 120 and predictive outcomes as inputs, wherein a machine-learning model incorporates a machine-learning process, and wherein "machine-learning process," as used herein, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language, and wherein a predictive outcome is described below. Weighted machine-learning model may include one or more weighted machine-learning processes such as supervised, unsupervised, or reinforcement machine-learning processes that computing device 104 and/or a remote device may or may not use in the determination of weighted vector 132. As used in this disclosure "remote device" is an external device to computing device 104. Weighted machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train weighted machine-learning process as a function of a weighted training set. As used in this disclosure a "weighted training set" is a training set that correlates a null element and/or a predictive outcome to a weighted vector. As used in this disclosure a "predictive outcome" is an outcome that is predicted and/or expected to occur. For example, and without limitation, predictive outcome may denote an expected outcome of a successful attempt to resolve a credit dispute. As a further non-limiting example, predictive outcome may denote an expected outcome of a failure to resolve a credit dispute. For example, and without limitation, weighted training set may correlate a null element of a violation and a predictive outcome of a successful attempt to resolve a credit dispute to a weighted vector of a 94% expectation of resolving the dispute. The weighted training set may be received as a function of user-entered valuations of null elements, predictive outcomes, and/or weighted vectors. Computing device 104 may receive weighted training set by receiving correlations of null elements, and/or predictive outcomes that were previously received and/or identified during a previous iteration of identifying weighted vectors. The weighted training set may be received by one or more remote devices that at least correlate a null element and/or predictive outcome to a weighted vector. The weighted training set may be received in the form of one or more user-entered correlations of a null element and/or predictive outcome to a weighted vector.

Still referring to FIG. 1, computing device 104 may receive weighted machine-learning model from a remote device that utilizes one or more weighted machine learning processes, wherein a remote device is described above in detail. For example, and without limitation, a remote device may include a computing device, external device, processor, and the like thereof. Remote device may perform the weighted machine-learning process using the weighted training set to produce weighted vector 132 and transmit the output to computing device 104. Remote device may transmit a signal, bit, datum, or parameter to computing device 104 that at least relates to weighted vector 132. Additionally or alternatively, the remote device may provide an updated machine-learning model. For example, and without limitation, an updated machine-learning model may be comprised of a firmware update, a software update, a weighted machine-learning process correction, and the like thereof. As a non-limiting example a software update may incorporate a new null element that relates to a modified predictive outcome. Additionally or alternatively, the updated machine learning model may be transmitted to the remote device, wherein the remote device may replace the weighted machine-learning model with the updated machine-learning model and determine the weighted vector as a function of the null element using the updated machine-learning model. The updated machine-learning model may be transmitted by the remote device and received by computing device 104 as a software update, firmware update, or corrected weighted machine-learning model. For example, and without limitation weighted machine-learning model may utilize a random forest machine-learning process, wherein the updated machine-learning model may incorporate a gradient boosting machine-learning process.

Still referring to FIG. 1, computing device 104 may determine weighted vector 132 as a function of a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least one value. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, computing device 104 generates a contention scheme 136 as a function of weighted vector 132. As used in this disclosure a "contention scheme" is a plan and/or program that resolves and/or repairs one or more null elements. In an embodiment, and without limitation, generating contention scheme 136 may further comprise generating a ranked list. As used in this disclosure a "ranked list" is an organized index and/or arrangement of weighted vectors. In an embodiment, and without limitation, computing device 104 may generate ranked list as a function of a success parameter. As used in this disclosure a "success parameter" is a metric and/or parameter that denotes a likelihood of success in resolving a null element and/or a credit dispute. In an embodiment, and without limitation, success parameter may denote a 90% likelihood of success in resolving a null element and/or credit dispute. In another embodiment, and without limitation, success parameter may denote a 20% likelihood of success in resolving a null element and/or credit dispute. In an embodiment, and without limitation, computing device 104 may generate ranked list as a function of arranging a plurality of weighted vectors along an index and/or list such that the highest likelihood of success is at the top and the lowest likelihood of success is at the bottom. In another embodiment, and without limitation, computing device 104 may generate ranked list as a function of arranging a plurality of weighted vectors along an index and/or list such that the lowest likelihood of success is at the top and the highest likelihood of success is at the bottom. Additionally or alternatively, computing device may generate ranked list as a function of producing a priority element. As used in this disclosure a "priority element" is an element of data denoting that a weighted vector comprises a high degree of importance. For example, and without limitation, priority element may denote that a first weighted vector comprises a first priority element, wherein a second weighted vector comprises a second priority element, and wherein the first priority element is of greater importance than the second priority element. As a further non-limiting example, priority element may denote that a first weighted vector comprising a higher level of importance may be suggested to be resolved prior to a second weighted vector comprising a lower level of importance.

In an embodiment, and still referring to FIG. 1, generating contention scheme 136 further comprises presenting contention scheme 136 to a user. In an embodiment, and without limitation, presenting contention scheme 136 may include presenting the index and/or list on a graphical user interface (GUI). For the purposes of this disclosure, a "graphical user interface" is a device configured to present data or information in a visual manner to a user, computer, camera or combination thereof. In an embodiment, and without limitation, computing device 104 may present contention scheme 136 to the user, wherein the computing device receives a preferred input. As used in this disclosure a "preferred input" is an input and/or signal received by a user that represents a user's desire, wish and/or want. For example, and without limitation, preferred input may denote that a user desires to resolve a first weighted vector and/or null element. As a further non-limiting example, preferred input may denote that a user desired to resolve a plurality of weighted vectors and/or null elements simultaneously. In an embodiment, and without limitation, computing device may receive preferred input as a function of a haptic, audio, visual, gesture, passkey, or other type of interaction from the user In an embodiment, and without limitation, computing device 104 may receive a plurality of preferred inputs, wherein computing device 104 may perform one or more linear optimizations, mixed integer optimizations, and the like thereof to determine a resolution to the plurality of weighted vectors and/or null elements. Additionally or alternatively, generating contention scheme 136 may further comprise producing a resolution document as a function of contention scheme 136. As used in this disclosure a "resolution document" is one or more documents that allow a null element and/or weighted vector to be resolved. As a non-limiting example, resolution document may include one or more credit dispute documents. As a further non-limiting example, resolution document may include one or more documents directed to inaccurate credit reporting procedures. In an embodiment, and without limitation, computing device may prepare resolution document as a function of solvency signature 108 and/or user identifier. For example, and without limitation, computing device 104 may automatedly enter all user identifier information. In another embodiment, and without limitation, computing device 104 may transmit one or more resolution documents to solvency entity. For example, and without limitation, computing device 104 may automatedly transmit a resolution document of a plurality of resolution documents to a solvency entity.

Figure 2:
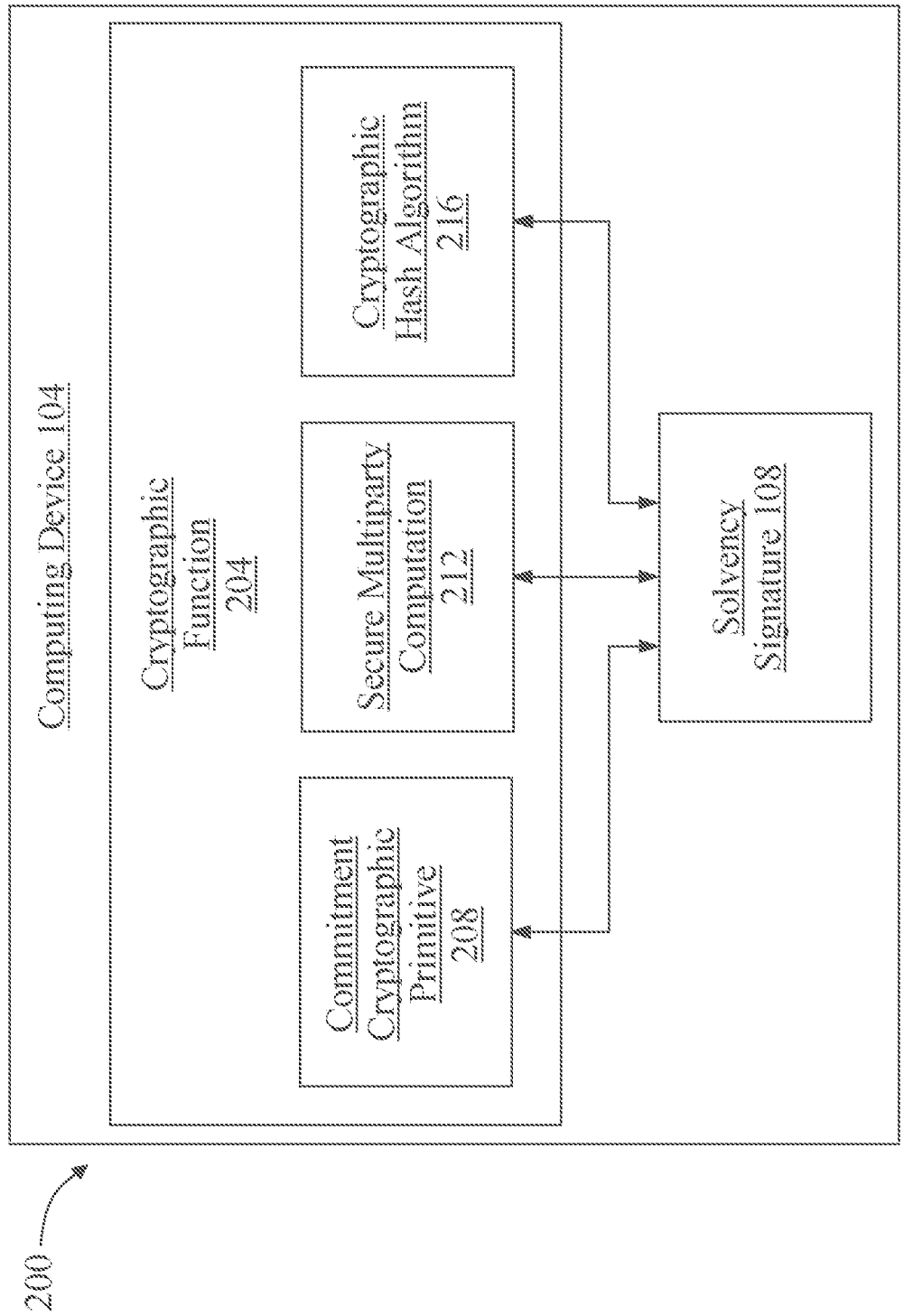
FIG. 2 is a block diagram illustrating an exemplary embodiment of cryptographic functions.

Now referring to FIG. 2, an exemplary embodiment 200 of a cryptographic function 204 according to an embodiment of the invention is illustrated. As used in this disclosure a "cryptographic function" is a mathematical algorithm that transforms plaintext data into ciphertext that is incomprehensible without first being decrypted, wherein "plaintext" is data in a first form which is intelligible when viewed in its intended format, and "ciphertext" is a second form of data which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic function 204 may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 2, cryptographic function 204 may be utilized to at least convert plain text data relating to solvency signature 108 into ciphertext data that is at least unrecognizable. Cryptographic function may be utilized to at least prevent solvency signature 108 from being duplicated, reproduced, and/or accessed inadvertently. Alternatively, cryptographic function 204 may be used to convert ciphertext data into plaintext data as a function of converting a user identifier into solvency signature 108. In an embodiment, and without limitation, cryptographic function 204 may include a commitment cryptographic primitive 208. As used in this disclosure "commitment cryptographic primitive" is a scheme that allows one to commit to a chosen value while keeping it hidden to others with the ability to reveal the committed value later. Commitment cryptographic primitive 208 may be designed so that a user cannot change the value or statement after they have submitted and/or committed to the value. Commitment cryptographic primitive 208 may include a "vector commitment" which may act as an accumulator in which an order of elements in set is preserved in its root and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). In addition to Merkle trees, commitment cryptographic primitive 208 may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function but given an output it is computationally infeasible and/or impossible to generate the input that produces the output via the one-way function. For instance, and by way of illustration, a Merkle tree may be based on a hash function as described below. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Still referring to FIG. 2, commitment cryptographic primitive 208 may include one or more cryptographic hiding commitments. As used in this disclosure, "cryptographic hiding commitment" is one or more commitment schemes that at least contain and/or hide secret information and/or a secret datum within the commitment scheme. As a non-limiting example cryptographic hiding commitment may include a Fujisaki-Okamoto commitment scheme, wherein a Fujisaki-Okamoto commitment scheme is a statistically hiding, computationally binding commitment scheme. As a further non-limiting example a committer commits to something and sends the resulting commitment to the verifier, wherein the verifier needs to verify that the opening of the commitment matches the commitment previously sent. The Fujisaki-Okamoto commitment scheme uses a special RSA group, wherein an untrusted party generates the RSA group needed to prove to the committer that each g may be in the group generated by h, so that the commitment may be statistically hiding. This can be done by proving in zero knowledge the knowledge of $a_i$ such that $g_i = h^{a_i}$ mod n. The committer may not generate or know p, q, p', q', $a_1, \ldots, a_m$, as otherwise the scheme will not provide any meaningful binding property. Additionally or alternatively, cryptographic hiding commitment may include a Pedersen commitment scheme, wherein a Pedersen commitment scheme is a statistically hiding, computationally binding commitment scheme that allows for commitments to values between 1 and primeOrder−1. The Pedersen commitment scheme may use a prime-order group, wherein an untrusted party generates the prime-order group, then the participants, both the committer and the verifier, need to check that both primeModulus and primeOrder are primes, such that primeOrder divides primeModulus−1 and that $g_i$, h have order primeOrder, which may be equivalent to saying that $g_i \neq 1$ mod primeModulus and $g^{primeOrder_i} = 1$ mod primeModulus. In the Pedersen commitment scheme the committer may not know the relative discrete logarithms of the bases, or otherwise the commitment may no longer be binding.

Still referring to FIG. 2, commitment cryptographic primitive 208 may include one or more secure proofs. As used in this disclosure a "secure proof," is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 2, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 2, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 2, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 2, an embodiment may include a secure proof that is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 2, cryptographic function 204 may include at least a secure multiparty computation 212. As used in this disclosure "secure multiparty computation" is a process whereby at least two parties, which may be devices furnishing inputs such as binary inputs, provide inputs to a process that performs a calculation using the inputs to produce a result; each set of inputs is based on a secret possessed by the corresponding party. Two-party computations include user that prepares a network and sends it to a user that is a receiver, who obliviously evaluates the network, learning the encodings corresponding to both the receiver's and the user's output. The receiver then transmits back the user's encoding, allowing the user to compute his part of the output. The user sends the mapping from the receivers output encodings to bits to the receiver, allowing the receiver to obtain the output. Two-party computations include at least a double-keyed symmetric encryption scheme that at least encodes the scheme with a random number and/or label. If each party to a secure multiparty computation submits its inputs according to an assumed set of protocols, then neither party nor any observer to the process can deduce either secret, even given the circuit performing the calculation and both sets of inputs. Inputs may be provided to circuit using, for instance, oblivious transfer protocols, wherein party providing input provides a secret share based on secret to the circuit without being in a position to determine which secret share has been provided. Exemplary secure multiparty computation processes include without limitation the Yao's Garbled Circuits solution to the "millionaire's problem"; persons skilled in the art, upon reviewing the entirety of this disclosure, will be aware of various protocols for implementation of secure multiparty computation that may be applied to perform secure proof as described herein.

Still referring to FIG. 2, secure multiparty computation 212 may include multiparty-protocols. Multi-party protocols may include at least three or more parties wherein data in the network is shared amongst the parties and a protocol is then used to evaluate each element of the data. Multi-party protocols may incorporate one or more secret sharing schemes that at least allow onto distribute a secret among a number of parties by distributing shares to each party. Secret sharing scheme may include Shamir secret sharing and additive secret sharing. Shamir secret sharing scheme allows the data in the network to be secured against a passive adversary when and an active adversary when while achieving information-theoretic security, wherein even if the adversary has unbounded computational power, they cannot learn any information about the secret underlying a share. Alternatively, additive secret sharing schemes allows the data in the network to tolerate the adversary controlling all but one party, while maintaining security against a passive and active adversary with unbounded computational power.

Still referring to FIG. 2, cryptographic function 204 may include a cryptographic hash algorithm 216. As used in this disclosure "cryptographic hash algorithm" is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 2, cryptographic hashing algorithm 216 may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")—family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Figure 3:
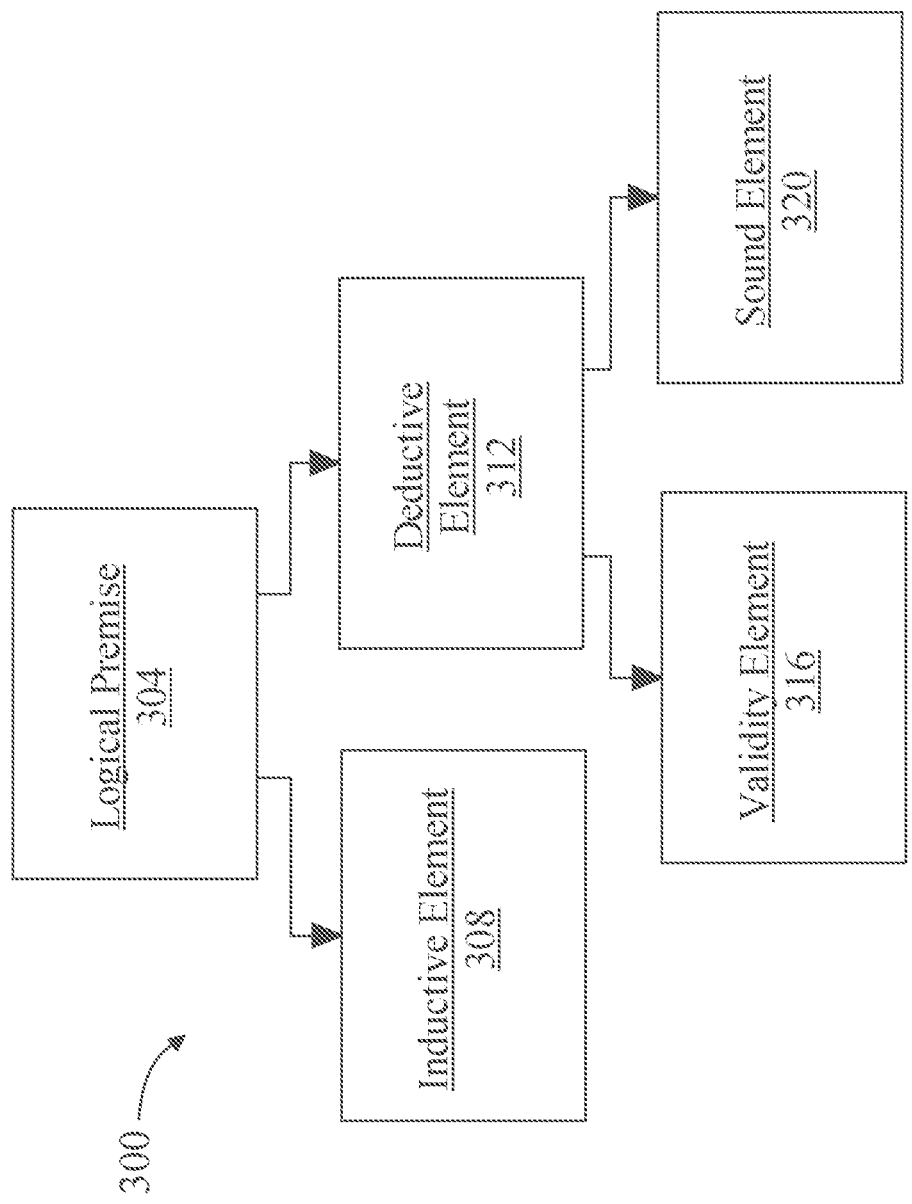
FIG. 3 is a block diagram illustrating an exemplary embodiment of a logical premise.

Now referring to FIG. 3, an exemplary embodiment 300 of a logical premise 304 is illustrated. As used in this disclosure a "logical premise" is a reasoning and/or argument that is outlined as a function of a logical flow path. In an embodiment, and without limitation, logical premise 304 may include one or more reasonings such as but not limited to abductive reasoning, defeasible reasoning, paraconsistent reasoning, probabilistic reasoning, statistical reasoning, non-demonstrative reasoning, and the like thereof. In an embodiment, and without limitation, logical premise 304 may include an inductive element 308. As used in this disclosure an "inductive element" is a logical reasoning that identifies a conclusion as a function of a precondition. For example, and without limitation, inductive element 304 may support a determination of a rule and/or hypothesizes a rule after a plurality of examples are identified as a conclusion. For example, and without limitation, inductive element 304 may denote one or more generalizations as a function of empirical evidence. In another embodiment, and without limitation, logical premise 304 may include a deductive element 312. As used in this disclosure a "deductive element" is a logical reasoning that determines a conclusion as a function of a rule. For example, and without limitation, deductive reasoning may denote that if A=C and B=C, then A=C. In an embodiment, and without limitation, deductive element 308 may assert a conclusion as a function of a mathematical logic, philosophical logic, logical consequence, and the like thereof. In another embodiment, deductive element 308 may denote one or more truth-preserving arguments. In an embodiment, and without limitation deductive element 308 may include a validity element 312. As used in this disclosure a "validity element" is an element of data denoting that an argument follows a logical flow path properly. For example, validity element 312 may denote that logical premise 304 has a valid logical form and/or valid argument. As a further non-limiting example, validity element 312 may denote that logical premise 304 is valid if and only if the denial of the conclusion is incompatible with accepting all the premises. As a further non-limiting example, validity element 312 may denote a corresponding conditional as valid if the corresponding conditional is a logical truth, wherein a corresponding conditional is a corresponding statement form representing each argument form, and wherein a logical truth is a true statement that is true regardless of the truth and/or falsity of its constituent propositions. In another embodiment, and without limitation, deductive element 312 may include a sound element 320. As used in this disclosure a "sound element" is an element of data denoting that a conclusion of an argument follows from a premise. In an embodiment, and without limitation, sound element 320 may denote one or more truths and/or falsities of logical premise 304. In an embodiment, and without limitation, sound element 320 may denote that a logical premise is true and/or that a logical premise is false.

Figure 4:
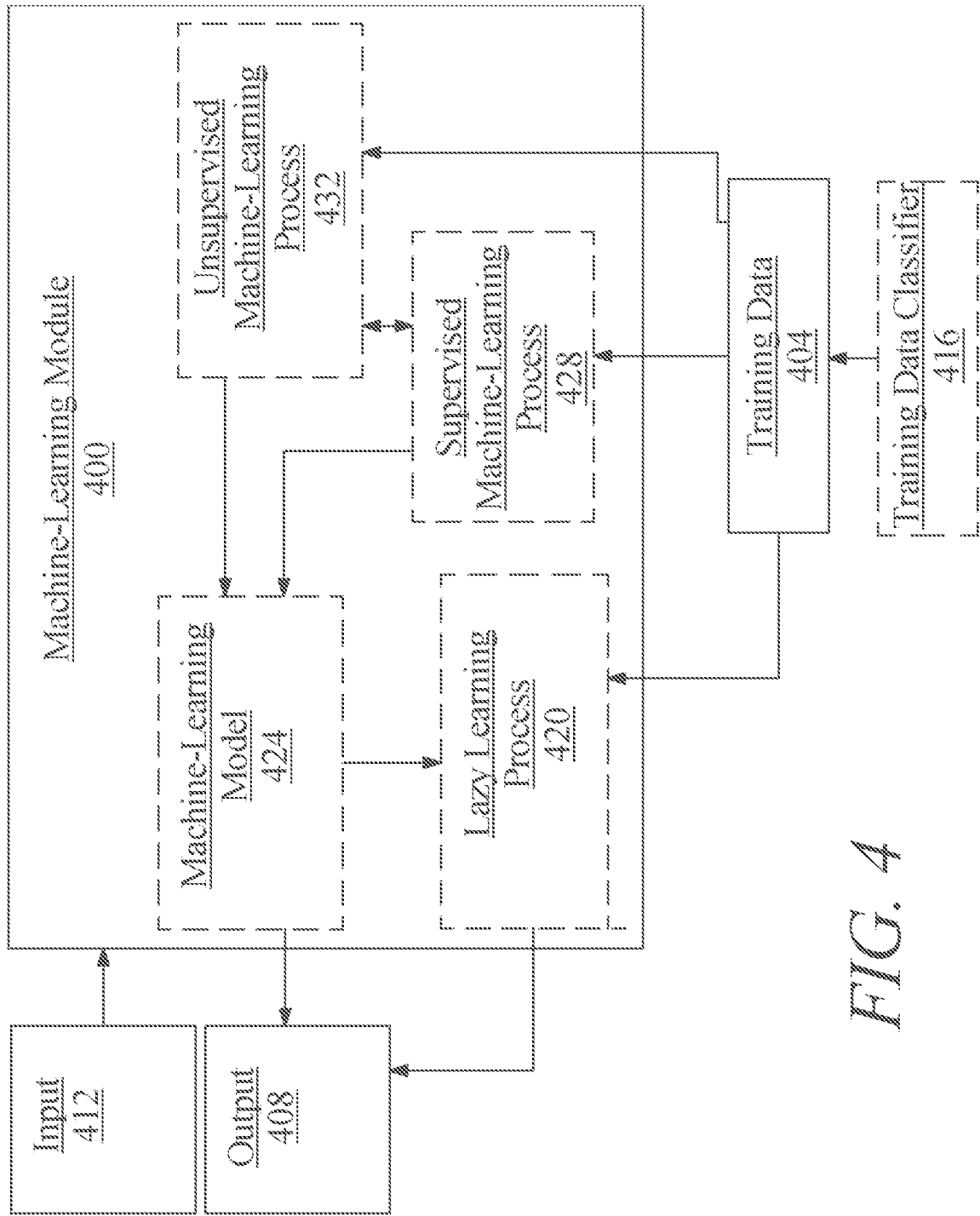
FIG. 4 is a block diagram of an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs of a null element may result in an output of a weighted vector.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of data such as, but not limited to categories denoting a weak violation, medium violation, and/or strong violation].

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include null elements as described above as inputs, weighted vectors as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
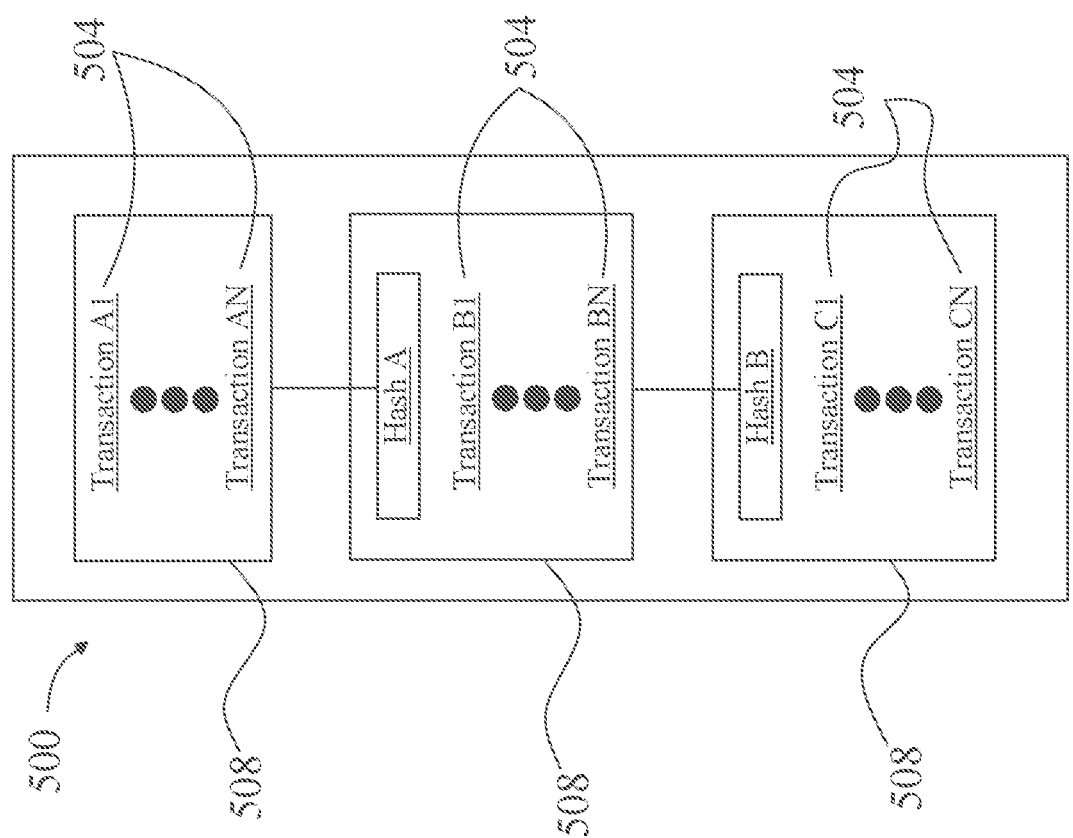
FIG. 5 is a block diagram of an exemplary embodiment of an immutable sequential listing.

Referring now to FIG. 5, an exemplary embodiment of an immutable sequential listing 500 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. Data elements are listing in immutable sequential listing 500; data elements may include any form of data, including textual data, image data, encrypted data, cryptographically hashed data, and the like. Data elements may include, without limitation, one or more at least a digitally signed assertion.

In one embodiment, a digitally signed assertion 504 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 504. In an embodiment, collection of textual data states that the owner of a certain transferable item represented in a digitally signed assertion 504 register is transferring that item to the owner of an address. A digitally signed assertion 504 may be signed by a digital signature created using the private key associated with the owner's public key, as described above.

Still referring to FIG. 5, a digitally signed assertion 504 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 2504 may describe the transfer of a physical good; for instance, a digitally signed assertion 2504 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 504 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 5, in one embodiment, an address is a textual datum identifying the recipient of virtual currency or another item of value in a digitally signed assertion 504. In some embodiments, address is linked to a public key, the corresponding private key of which is owned by the recipient of a digitally signed assertion 504. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 504 may record a subsequent a digitally signed assertion 504 transferring some or all of the value transferred in the first a digitally signed assertion 504 to a new address in the same manner. A digitally signed assertion 504 may contain textual information that is not a transfer of some item of value in addition to, or as an alternative to, such a transfer. For instance, as described in further detail below, a digitally signed assertion 504 may indicate a confidence level associated with a distributed storage node as described in further detail below.

In an embodiment, and still referring to FIG. 5 immutable sequential listing 500 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 500 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 5, immutable sequential listing 500 may preserve the order in which the at least a posted content took place by listing them in chronological order; alternatively or additionally, immutable sequential listing 500 may organize digitally signed assertions 504 into sub-listings 508 such as "blocks" in a blockchain, which may be themselves collected in a temporally sequential order; digitally signed assertions 2504 within a sub-listing 508 may or may not be temporally sequential. The ledger may preserve the order in which at least a posted content took place by listing them in sub-listings 508 and placing the sub-listings 508 in chronological order. The immutable sequential listing 500 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 500 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 500, once formed, may be inalterable by any party, no matter what access rights that party possesses. For instance, immutable sequential listing 500 may include a hash chain, in which data is added during a successive hashing process to ensure non-repudiation. Immutable sequential listing 500 may include a block chain. In one embodiment, a block chain is immutable sequential listing 500 that records one or more new at least a posted content in a data item known as a sub-listing 508 or "block." An example of a block chain is the BITCOIN block chain used to record BITCOIN transactions and values. Sub-listings 508 may be created in a way that places the sub-listings 508 in chronological order and link each sub-listing 508 to a previous sub-listing 508 in the chronological order so that any computing device may traverse the sub-listings 508 in reverse chronological order to verify any at least a posted content listed in the block chain. Each new sub-listing 508 may be required to contain a cryptographic hash describing the previous sub-listing 508. In some embodiments, the block chain contains a single first sub-listing 508 sometimes known as a "genesis block."

Still referring to FIG. 5, the creation of a new sub-listing 508 may be computationally expensive; for instance, the creation of a new sub-listing 508 may be designed by a "proof of work" protocol accepted by all participants in forming the immutable sequential listing 500 to take a powerful set of computing devices a certain period of time to produce. Where one sub-listing 508 takes less time for a given set of computing devices to produce the sub-listing 508 protocol may adjust the algorithm to produce the next sub-listing 508 so that it will require more steps; where one sub-listing 508 takes more time for a given set of computing devices to produce the sub-listing 508 protocol may adjust the algorithm to produce the next sub-listing 508 so that it will require fewer steps. As an example, protocol may require a new sub-listing 508 to contain a cryptographic hash describing its contents; the cryptographic hash may be required to satisfy a mathematical condition, achieved by having the sub-listing 508 contain a number, called a nonce, whose value is determined after the fact by the discovery of the hash that satisfies the mathematical condition. Continuing the example, the protocol may be able to adjust the mathematical condition so that the discovery of the hash describing a sub-listing 508 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 508 according to the protocol is known as "mining." The creation of a new sub-listing 508 may be designed by a "proof of stake" protocol as will be apparent to those skilled in the art upon reviewing the entirety of this disclosure.

Continuing to refer to FIG. 5, in some embodiments, protocol also creates an incentive to mine new sub-listings 508. The incentive may be financial; for instance, successfully mining a new sub-listing 508 may result in the person or entity that mines the sub-listing 508 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 508 Each sub-listing 508 created in immutable sequential listing 500 may contain a record or at least a posted content describing one or more addresses that receive an incentive, such as virtual currency, as the result of successfully mining the sub-listing 508.

With continued reference to FIG. 5, where two entities simultaneously create new sub-listings 508, immutable sequential listing 500 may develop a fork; protocol may determine which of the two alternate branches in the fork is the valid new portion of the immutable sequential listing 500 by evaluating, after a certain amount of time has passed, which branch is longer. "Length" may be measured according to the number of sub-listings 508 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 508 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 500 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 500.

Still referring to FIG. 5, additional data linked to at least a posted content may be incorporated in sub-listings 508 in the immutable sequential listing 500; for instance, data may be incorporated in one or more fields recognized by block chain protocols that permit a person or computer forming a at least a posted content to insert additional data in the immutable sequential listing 500. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 5, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 508 in a block chain computationally challenging; the incentive for producing sub-listings 508 may include the grant of new crypto-currency to the miners. Quantities of crypto-currency may be exchanged using at least a posted content as described above.

Figure 6:
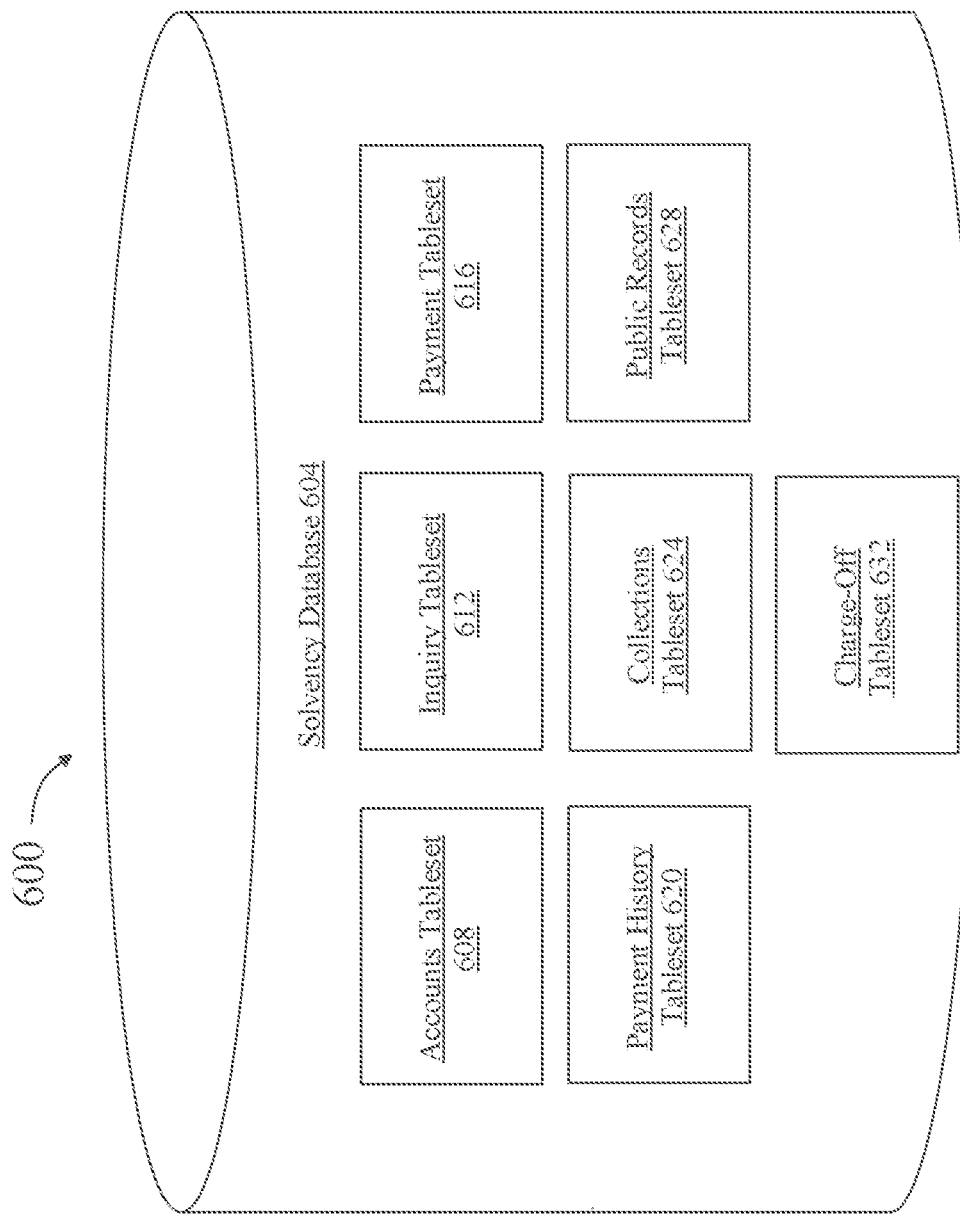
FIG. 6 is a block diagram of an exemplary embodiment of a solvency database.

Now referring to FIG. 6 an exemplary embodiment of a solvency database 604 is illustrated. As used in this disclosure a "solvency database" is a datastore and/or databank comprising a category and/or grouping of data that relates to a solvency signature. Solvency database 604 may be implemented, without limitation, as a relational database, a key-value retrieval database such as a NOSQL database, or any other format or structure for use as a database that a person skilled in the art would recognize as suitable upon review of the entirety of this disclosure. Solvency database 604 may alternatively or additionally be implemented using a distributed data storage protocol and/or data structure, such as a distributed hash table or the like. Solvency database 604 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

In an embodiment, and still referring to FIG. 6, solvency database 604 may include an accounts tableset 608. As used in this disclosure an "accounts tableset" is a table of data denoting a magnitude of credit accounts relating to solvency signature 108. For example, and without limitation, accounts tableset 608 may denote that an individual has 8 credit accounts. In another embodiment, and without limitation, solvency database 604 may include an inquiry tableset 612. As used in this disclosure an "inquiry tableset" is a table of data denoting a magnitude of inquiries and/or searches of solvency signature 108. For example, and without limitation, inquiry tableset 612 may denote that an individual has had 3 inquiries on their credit account in the last 2 years. In another embodiment, and without limitation, solvency database 604 may include a payment tableset 616. As used in this disclosure a "payment tableset" is a table of data denoting a payment element, wherein a payment element denotes one or more payment statuses, payment status dates, past-due amounts, monthly payments, late payments, and the like thereof. As a non-limiting example, payment table set 616 may denote that an individual has 3 past-due payments for a credit account. In another embodiment, and without limitation, solvency database 604 may include a payment history tableset 620. As used in this disclosure a "payment history tableset" is a table of data denoting one or more records and/or histories of payments on credit accounts. For example, and without limitation, payment history tableset 620 may denote a history comprising a closed status, chapter 13 bankruptcy status, collection status, default status, foreclosure status, claim status, paid status, repossession status, voluntary surrender status, and the like thereof. In another embodiment, and without limitation, solvency database 604 may include a collections tableset 624. As used in this disclosure a "collections tableset" is a table of data denoting one or more credit accounts in collections. For example, and without limitation, collections tableset 624 may denote that an individual has 4 accounts in collections. In another embodiment, and without limitation, solvency database 604 may include a public records tableset 628. As used in this disclosure a "public records tableset" is table of data denoting one or more elements related to an individual's public record. For example, and without limitation, public records tableset 628 may include one or more tax liens, civil judgements, bankruptcies, and the like thereof. Additionally or alternatively, solvency database 604 may include a charge-off tableset 632. As used in this disclosure a "charge-off tableset" is a table of data denoting one or more declarations by a creditor that an amount of debt is unlikely to be collected. For example, and without limitation, charge-off tableset 632 may denote that an individual has 12 accounts that have declarations by a creditor that an amount of debt is unlikely to be collected.

Figure 7:
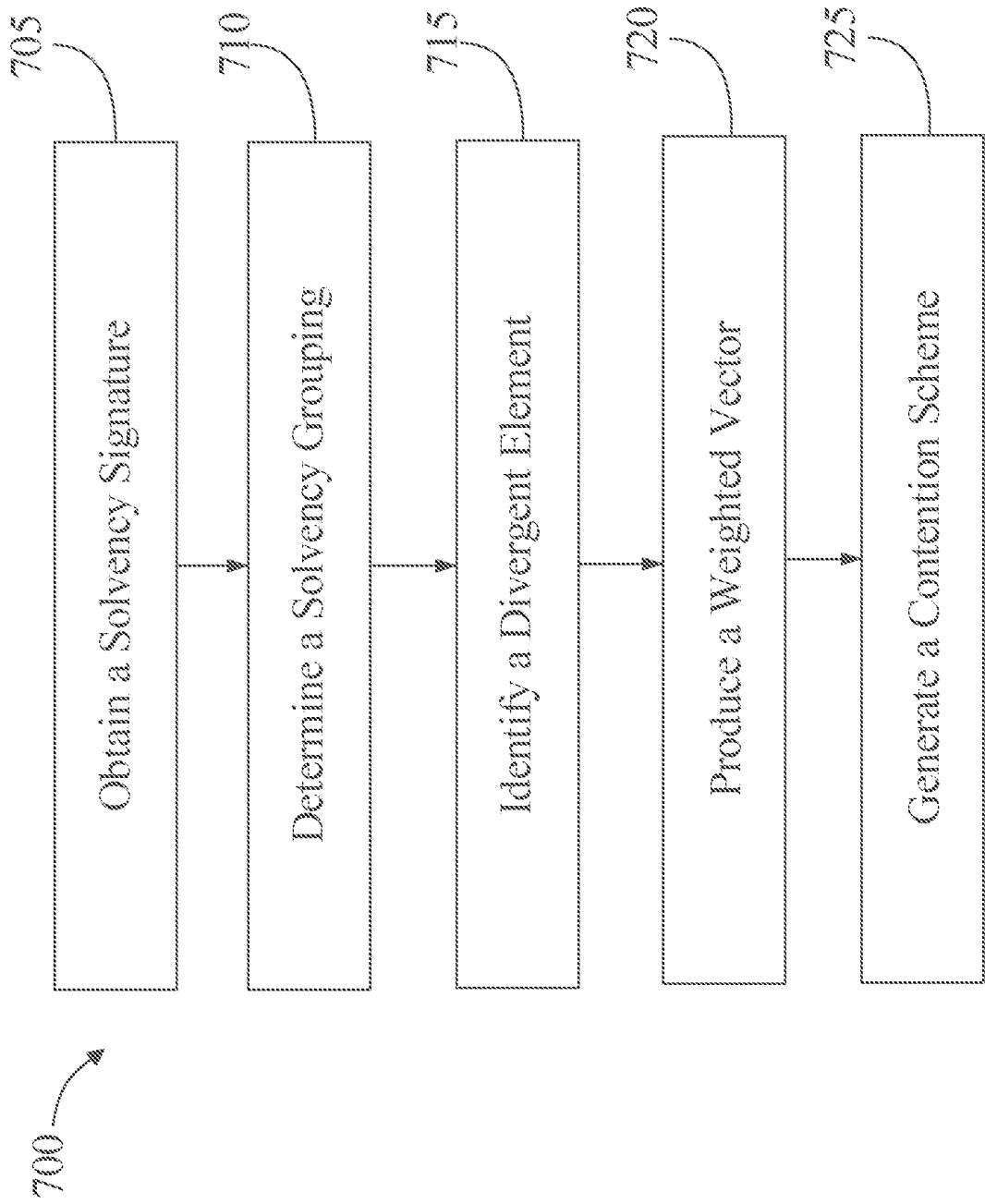
FIG. 7 is a flow diagram illustrating an exemplary embodiment of a method for generating a contention scheme.

Now referring to FIG. 7, an exemplary embodiment of a method 700 for generating a contention scheme is illustrated. At step 705, a computing device 104 obtains a solvency signature 108. Computing device 104 includes any of the computing device 104 as described above, in reference to FIGS. 1-6. Solvency signature 108 includes any of the solvency signature 108 as described above, in reference to FIGS. 1-6. Computing device 104 obtains solvency signature 108 as a function of a solvency entity 112. Solvency entity 112 includes any of the solvency entity as described above, in reference to FIGS. 1-6.

Still referring to FIG. 7, at step 710, computing device 104 determines a solvency grouping 116 as a function of solvency signature 108. Solvency grouping 116 includes any of the solvency grouping 116 as described above, in reference to FIGS. 1-6.

Still referring to FIG. 7, at step 715, computing device 104 identifies a null element 120 as a function of solvency grouping 116. Null element 120 includes any of the null element 120 as described above, in reference to FIGS. 1-6. Computing device 104 identifies null element 120 as a function of receiving a regulation element 124. Regulation element 124 includes any of the regulation element 124 as described above, in reference to FIGS. 1-6. Computing device 104 receives regulation element 124 as a function of a regulation database 128. Regulation database 128 includes any of the regulation database 128 as described above, in reference to FIGS. 1-6. Computing device 104 identifies null element 120 as a function of regulation element 124 and solvency grouping 116.

Still referring to FIG. 7, at step 720, computing device 104 produces a weighted vector 132 as a function of null element 120. Weighted vector 132 includes any of the weighted vector 132 as described above, in reference to FIGS. 1-6.

Still referring to FIG. 7, at step 720, computing device 104 generates a contention scheme 136 as a function of weighted vector 132. Contention scheme 136 includes any of the contention scheme 136 as described above, in reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
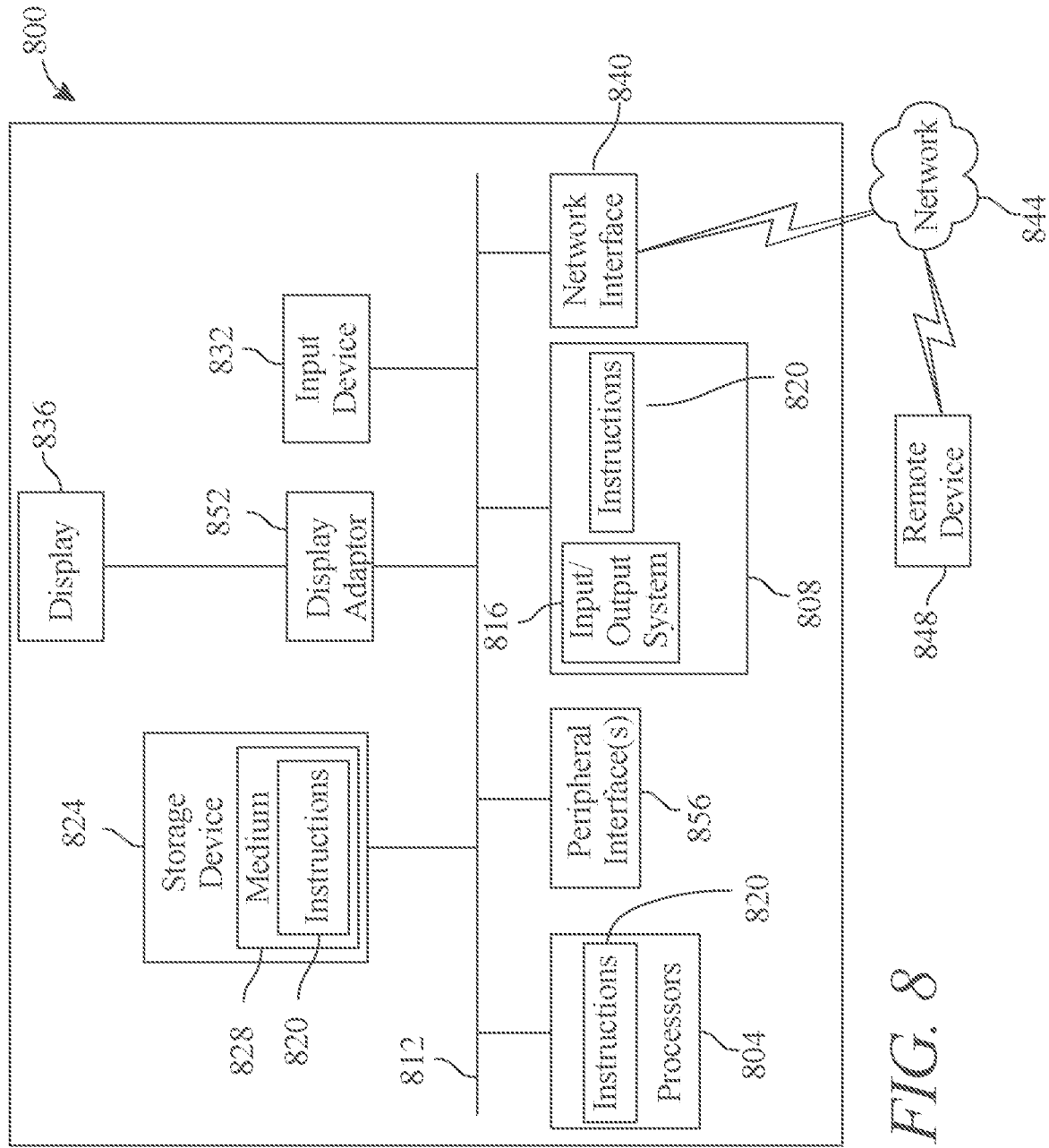
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 720 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating a contention scheme, the system comprising a computing device, the computing device configured to:

obtain a solvency signature associated with a user from a solvency entity, wherein the solvency signature comprises the user's iris patterns in conjunction with a bank record, wherein obtaining the solvency signature comprises encrypting the solvency signature as a function of a cryptographic function, wherein the cryptographic function includes a commitment cryptographic primitive;

determine a solvency grouping based on the solvency signature;

identify a null element based on the solvency grouping, wherein identifying the null element further comprises:
receiving a regulation element from a regulation database, wherein receiving the regulation element further comprises obtaining a regulation input, wherein the regulation input includes a user-entered input including information on the solvency signature; and
identifying the null element based on the regulation element and the solvency grouping;

produce a weighted vector based on the null element, wherein producing the weighted vector further comprises:
training a weighted machine-learning model based on a weighted training set that correlates a predictive outcome to the null element; and
producing the weighted vector based on the weighted machine-learning model, wherein the weighted machine-learning model receives the null element as an input and outputs the weighted vector;

generate a contention scheme based on the weighted vector with a success parameter, wherein the contention scheme includes a success probability of resolving the null element; and presenting the contention scheme on a graphical user interface (GUI).

2. The system of claim 1, wherein the solvency signature includes a user identifier.

3. The system of claim 1, wherein identifying the null element further comprises determining a proposition based on a logical premise.

4. The system of claim 1, wherein generating the contention scheme further comprises generating a ranked list based on the weighted vector.

5. The system of claim 4, wherein generating the ranked list further comprises producing a priority element.

6. The system of claim 1, wherein generating the contention scheme further comprises:
presenting the contention scheme to the user; and
receiving a preferred input.

7. The system of claim 1, wherein generating the contention scheme further comprises producing a resolution document based on the contention scheme.

8. The system of claim 1, wherein the user-entered input further includes information on accuracy of the solvency signature.

9. The system of claim 1, wherein the user-entered input further includes information on a relationship between the solvency signature and the solvency grouping.

10. The system of claim 1, wherein the solvency signature includes data in an immutable sequential listing of a blockchain.

11. The system of claim 1, wherein commitment cryptographic primitive includes at least one cryptographic hiding commitment.

12. A method for generating a contention scheme, the method comprising:
obtaining, by a computing device, a solvency signature associated with a user from a solvency entity, wherein the solvency signature comprises the user's iris patterns in conjunction with a bank record, wherein obtaining the solvency signature comprises encrypting the solvency signature as a function of a cryptographic function, wherein the cryptographic function includes a commitment cryptographic primitive;

determining, by the computing device, a solvency grouping based on the solvency signature;

identifying, by the computing device, a null element based on the solvency grouping, wherein identifying the null element further comprises:
receiving a regulation element from a regulation database, wherein receiving the regulation element further comprises obtaining a regulation input, wherein the regulation input includes a user-entered input including information on the solvency signature; and
identifying the null element based on the regulation element and the solvency grouping;

producing, by the computing device, a weighted vector based on the null element, wherein producing the weighted vector further comprises:
training a weighted machine-learning model based on a weighted training set that correlates a predictive outcome to the null element; and
producing the weighted vector based on the weighted machine-learning model, wherein the weighted machine-learning model receives the null element as an input and outputs the weighted vector;

generating, by the computing device, a contention scheme based on the weighted vector with a success parameter, wherein the contention scheme includes a success probability of resolving the null element; and presenting the contention scheme on a graphical user interface (GUI).

13. The method of claim 12, wherein the solvency signature includes a user identifier.

14. The method of claim 12, wherein identifying the null element further comprises determining a proposition based on a logical premise.

15. The method of claim 12, wherein generating the contention scheme further comprises generating a ranked list based on the weighted vector.

16. The method of claim 15, wherein generating the ranked list further comprises producing a priority element.

17. The method of claim 12, wherein generating the contention scheme further comprises:
presenting the contention scheme to the user; and
receiving a preferred input.

18. The method of claim 12, wherein generating the contention scheme further comprises producing a resolution document based on the contention scheme.

19. The method of claim 12, wherein the user-entered input further includes information on accuracy of the solvency signature.

20. The method of claim 12, wherein commitment cryptographic primitive includes at least one cryptographic hiding commitment.

* * * * *